(12) United States Patent
Wang et al.

(10) Patent No.: US 10,929,083 B2
(45) Date of Patent: Feb. 23, 2021

(54) RESOURCE SHARING DEVICE AND CONTROL METHOD THEREOF

(71) Applicant: ATEN International Co., Ltd., New Taipei (TW)

(72) Inventors: Xiao-Hong Wang, New Taipei (TW); Xing Hong, New Taipei (TW); Sung-Ting Dai, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/235,035

(22) Filed: Dec. 28, 2018

(65) Prior Publication Data

US 2019/0205079 A1 Jul. 4, 2019

(30) Foreign Application Priority Data

Dec. 29, 2017 (TW) .................................. 106146653

(51) Int. Cl.
*G06F 3/14* (2006.01)
*G06F 3/0354* (2013.01)
(Continued)

(52) U.S. Cl.
CPC ............ *G06F 3/1423* (2013.01); *G06F 3/038* (2013.01); *G06F 3/03543* (2013.01); *G09G 5/08* (2013.01);
(Continued)

(58) Field of Classification Search
CPC .. G06F 3/1423; G06F 3/03543; G06F 3/1446; G09G 5/08; G09G 2360/04; G09G 2300/026; G09G 2370/24; G09G 2354/00
See application file for complete search history.

(56) References Cited

U.S. PATENT DOCUMENTS 6,407,749 B1 * 6/2002 Duke .................... G06F 3/0481
345/660
2002/0105553 A1 * 8/2002 Segre ...................... G06F 3/023
715/862
(Continued)

FOREIGN PATENT DOCUMENTS

| CN | 101739137 A | 6/2010 |
| TW | 200949609 A | 12/2009 |
| TW | 201512849 A | 4/2015 |

OTHER PUBLICATIONS

Taiwanese Office Action, dated Oct. 29, 2018, in a counterpart Taiwanese patent application, No. TW 106146653.

*Primary Examiner* — Alexander Eisen
*Assistant Examiner* — Kebede T Teshome
(74) *Attorney, Agent, or Firm* — Chen Yoshimura LLP (57) ABSTRACT

A resource sharing device and control method thereof. The resource sharing device is electrically coupled to a plurality of computers and a mouse. The mouse is used to control a mouse cursor, and each computer is electrically coupled to a display. The steps include: identifying the spatial arrangement and resolutions of the displays; the computers initializing the respective positions of the mouse cursor; receiving a mouse displacement generated by the mouse; generating a mouse cursor displacement according to the mouse displacement and an acceleration setting; transmitting the mouse cursor displacement to one of the computers; determining whether the mouse cursor reaches a threshold; when the determination is affirmative, switching the mouse control to another computer.

20 Claims, 7 Drawing Sheets

(51) Int. Cl.
*G06F 3/038* (2013.01)
*G09G 5/08* (2006.01)
(52) U.S. Cl.
CPC ..... *G06F 3/1446* (2013.01); *G09G 2300/026* (2013.01); *G09G 2354/00* (2013.01); *G09G 2356/00* (2013.01); *G09G 2360/04* (2013.01); *G09G 2370/24* (2013.01)

(56) References Cited

U.S. PATENT DOCUMENTS

| | | | |
|---|---|---|---|
| 2009/0288042 A1 | 11/2009 | Cheng | |
| 2011/0047306 A1* | 2/2011 | Dickens | G06F 3/038 710/73 |
| 2014/0247214 A1* | 9/2014 | Cheng | G06F 3/033 345/157 |
| 2015/0002397 A1* | 1/2015 | Song | G06F 3/03543 345/163 |

* cited by examiner

RESOURCE SHARING DEVICE AND CONTROL METHOD THEREOF

BACKGROUND OF THE INVENTION

Field of the Invention

This invention relates to a resource sharing device and related control method, and in particular, it relates to a resource sharing device that can be used to control multiple computers and related control method.

Description of Related Art

A keyboard and mouse switch is a device that enables a set of keyboard and/or mouse etc. to be coupled to and to control multiple computers. Using such a device, the user does not need to provide a keyboard and mouse for each corresponding computer. A keyboard and mouse switch allows the user to use one set of keyboard and mouse to selectively control one of multiple computers by switching to different computers. Typically, each computer is coupled to a display device to display images of the computer, and each display device only displays the images of its corresponding computer. Using such a system, the user can easily gain control of a corresponding computer and view the corresponding display image by the switching function of the keyboard and mouse switch.

In conventional technologies, when the user wishes to switch the control from a current controlled computer to another computer, the user needs to perform manual switching. For example, the user may use pre-defined keystroke combinations in cooperation with a menu prompt displayed on the display device to select the computer to be controlled, and the keyboard and mouse switch performs the corresponding switching to switch to the user-selected computer. Or, in another example, the keyboard and mouse switch may be equipped with pre-defined press buttons which can be used by the user to perform selection and switching. Using such conventional switching control method, the manual operation process causes interruption for the user, and interferes with a smooth user experience. Therefore, a switching method for a keyboard and mouse switch that allows the user to more conveniently switch the control among multiple computers is needed.

The above descriptions are provided for a better understanding of the background of the present invention. The conventional technologies described herein are known to persons of ordinary skill in the art but do not prevent the novelty of the invention disclosed below.

SUMMARY

The present invention provides a resource sharing device that allows for a smooth switch among multiple computers.

The present invention also provides a resource sharing method that allows for a smooth switch among multiple computers.

Additional features and advantages of the invention will be set forth in the descriptions that follow and in part will be apparent from the description, or may be learned by practice of the invention.

To achieve some of all of the above objects, the present invention provides a control method for a resource sharing device, the resource sharing device being electrically coupled to multiple computers and a mouse. The mouse is configured to control a mouse cursor. Each computer is electrically coupled to a display device. The method includes: identifying the spatial arrangement and display resolutions of the display devices; instructing each of the computers to initialize the position of the mouse cursor; receiving a mouse displacement generated by the mouse; generating a mouse cursor displacement based on the mouse displacement and an acceleration setting; transmitting the mouse cursor displacement to one of the computers; determining whether the mouse cursor position has reached a threshold; when the determination is affirmative, switching the mouse control to another computer.

In another aspect, the present invention provides another control method for a resource sharing device. The resource sharing device is electrically coupled to a first computer, a second computer and a mouse, the first computer being electrically coupled to a first display device and the second computer being electrically coupled to a second display device. The method includes: electrically coupling the mouse to the first computer; detecting relative spatial positions and display resolutions of the first and second display devices; establishing a relative coordinate system based on the relative spatial positions and the display resolutions; turning off internal mouse cursor acceleration functions of the first and second computers; initializing the mouse cursor positions of the first and second computers based on the relative coordinate system; receiving a mouse displacement generated by the mouse; generating a mouse cursor displacement based on the mouse displacement and an acceleration setting; transmitting the mouse cursor displacement to the first computer, wherein the first computer displays a mouse cursor movement on the first display device based on the mouse cursor displacement; determining, based on the relative coordinate system and the mouse cursor displacement, whether the position of the mouse cursor has reached a threshold; then the determination is affirmative, switching the mouse to be electrically coupled to the second computer.

In another aspect, the present invention provides a resource sharing device, which includes: an input interface, configured to be electrically coupled to a mouse and to receive mouse displacements; a plurality of output interfaces, each configured to be electrically coupled to a computer which is in turn electrically coupled to a display device, and configured to transmit mouse displacements to the computer; a processor, electrically coupled to the input interface and the plurality of output interfaces, and configured to: identify a spatial arrangement and display resolutions of the display devices, instruct each of the computers to initialize a position of the mouse cursor, receive a mouse displacement generated by the mouse and generate a mouse cursor displacement based on the mouse displacement and an acceleration setting, transmit the mouse cursor displacement to one of the plurality of computers, and upon determining that the position of the mouse cursor has reached a threshold of a corresponding display device which is electrically coupled to the one computer, switch mouse control to another one of the plurality of computers; and a storage unit, electrically coupled to the processor, configured to store the acceleration setting, the mouse displacement and the mouse cursor displacement.

In the resource sharing device and its control method according to embodiments of the present invention, by determining whether the mouse cursor position has reached a threshold of the display device that is electrically coupled to the controlled computer in order to determine whether to switch the mouse control to another computer, smooth switching of the computers can be achieved.

To provide further explanation of the objects, characteristics and advantages of the present invention, preferred embodiments are described below with reference to the drawings.

DETAILED DESCRIPTION OF PREFERRED EMBODIMENTS

Figure 1:
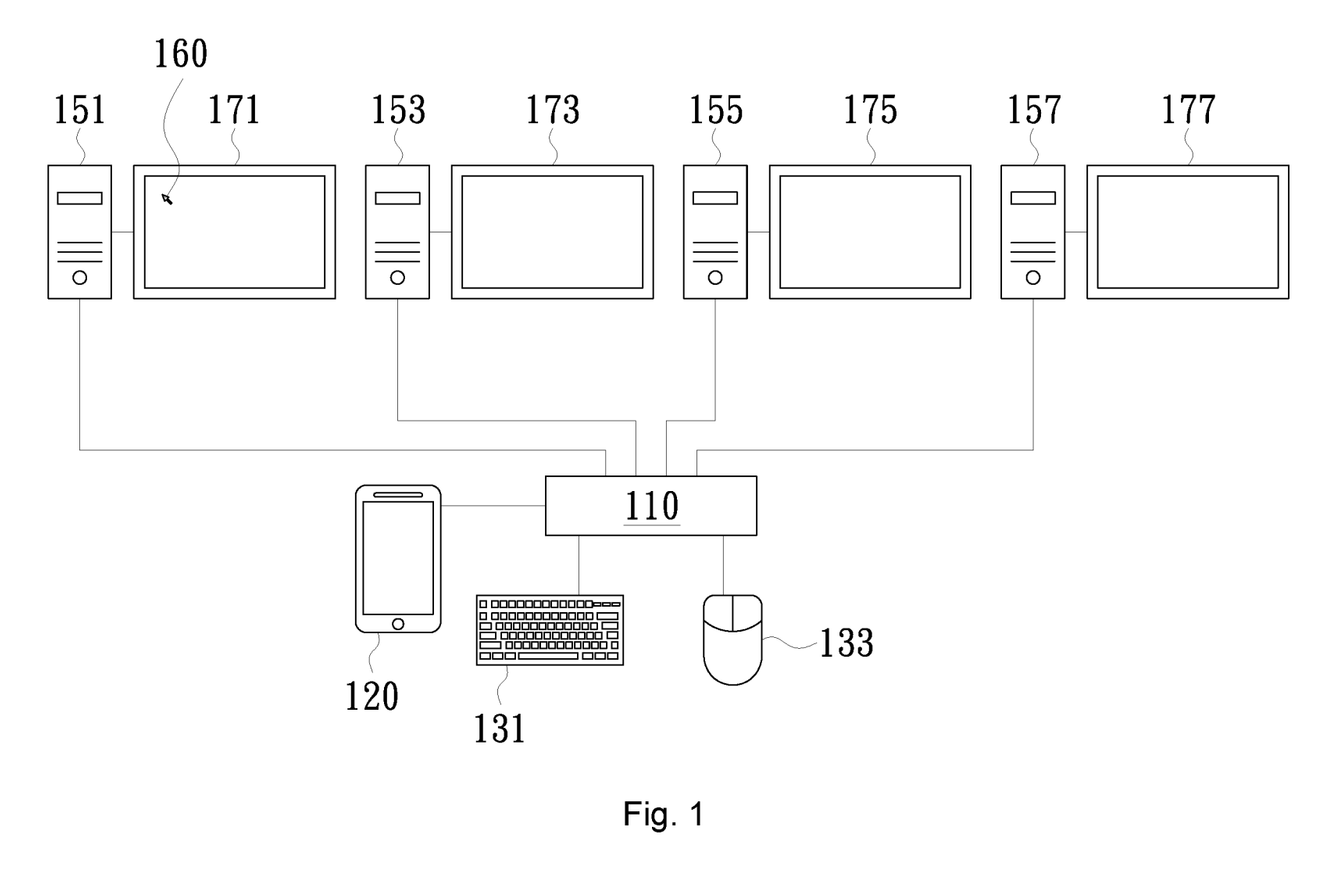
FIG. 1 schematically illustrates a resource sharing system according to an embodiment of the present invention.

FIG. 1 schematically illustrates a resource sharing system according to an embodiment of the present invention. The resource sharing device 110 is electrically coupled to a keyboard 131 and a mouse 133. The resource sharing device 110 is also electrically coupled to computers 151, 153, 155 and 157. Computers 151, 153, 155 and 157 are respectively coupled to display devices (e.g. monitors) 171, 173, 175 and 177. Each of the computers 151, 153, 155 and 157 may be, without limitation, a personal computer or a server, etc. The resource sharing device 110 may be optionally electrically coupled an external interface 120, described in more detail later.

The resource sharing device 110 of this embodiment can use the keyboard 131 and mouse 133 to control the computers 151, 153, 155 and 157 and the corresponding display devices 171, 173, 175 and 177. The resource sharing device 110 can determine whether to switch the control to another computer based on whether the position of the mouse cursor 160 exceeds the threshold positions of the display screen of the display device coupled to the computer that is currently being controlled. The spatial arrangement of the display screens of the computers 151, 153, 155 and 157 may be arranged in any manner, including, without limitation, horizontal array, vertical array, diagonal array, stacked, etc.

For example, assume that the mouse 133 is currently controlling computer 151 (i.e. the mouse control is currently switched to computer 151), and the display device that is adjacent to the display device 171 of the currently controlled computer 151 is display device 173 of computer 153. When the user wishes to control computer 153, the user can operate the mouse 133 to move the mouse cursor 160 toward the direction of the display device 173. When the resource sharing device 110 determines that the position of the mouse cursor 160 reaches a threshold of the display screen of the display device 171, it switches the mouse control to computer 153 (i.e. the mouse will now control computer 153). Thus, the user can gain control of the corresponding computer without having to manually switch the control as in the conventional technology. The operation details will be described later.

Figure 2:
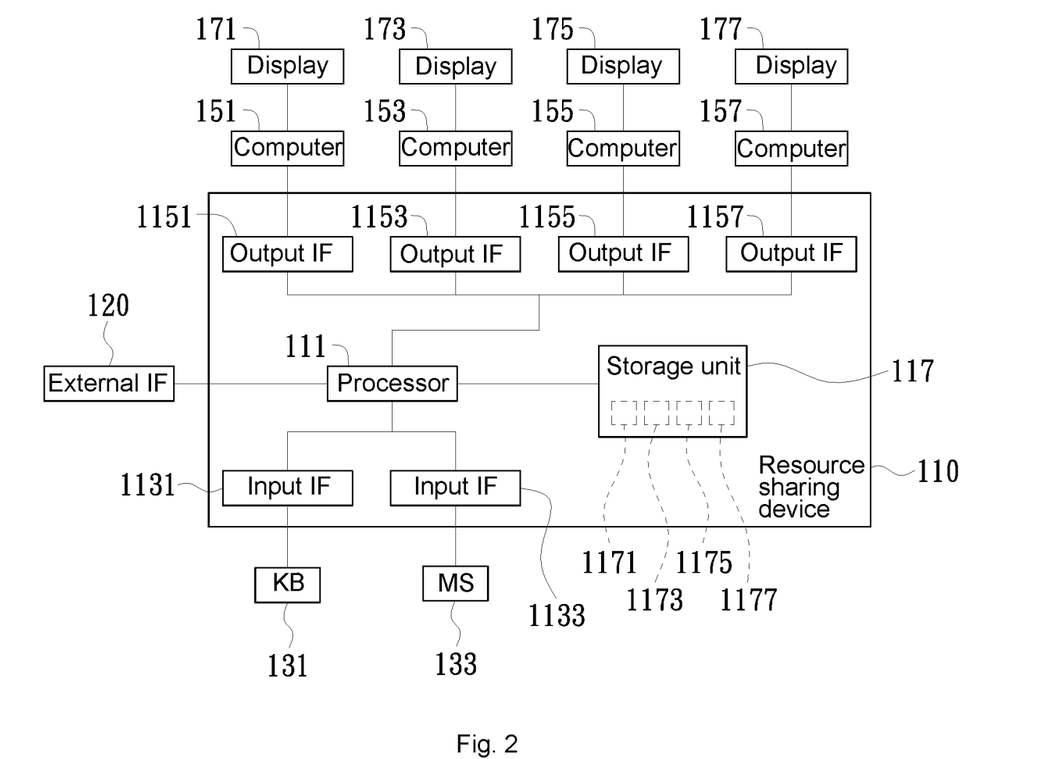
FIG. 2 is a block diagram of the resource sharing system according to an embodiment of the present invention.

FIG. 2 is a block diagram of the resource sharing system according to an embodiment of the present invention. Referring to FIG. 1 and FIG. 2, the resource sharing device 110 includes: a processor 111, a storage unit (e.g. a non-volatile memory) 117, input interfaces 1131, 1133, and output interfaces 1151, 1153, 1155 and 1157. The processor 111 is electrically coupled to the input interfaces 1131, 1133, the output interfaces 1151, 1153, 1155 and 1157, and the storage unit 117. The input interfaces 1131, 1133 are respectively electrically coupled to the keyboard 131 and mouse 133. The output interfaces 1151, 1153, 1155 and 1157 are respectively electrically coupled to the computers 151, 153, 155 and 157. The computers 151, 153, 155 and 157 are respectively electrically coupled to the display devices 171, 173, 175 and 177. In the illustrated embodiment, the resource sharing device 110 has four output interfaces 1151, 1153, 1155 and 1157 as examples, but the invention is not limited to such.

Figure 3A:
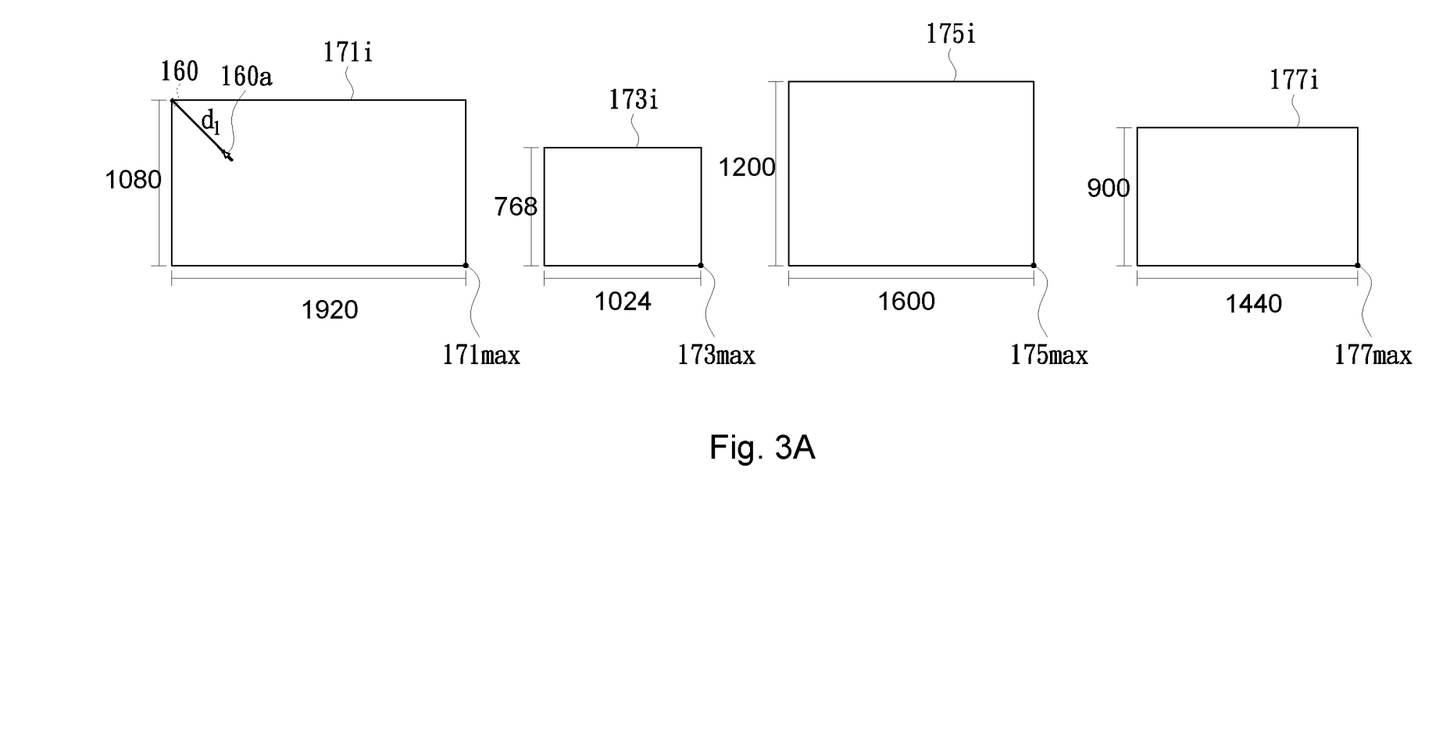
FIG. 3A schematically illustrates the display screens of multiple display devices of the resource sharing system according to an embodiment of the present invention.

Referring to FIGS. 1-3A, where FIG. 3A schematically illustrates the display screen of multiple display devices of the resource sharing system in the embodiment of FIG. 1. In this embodiment, take the example of switching control between computer 151 and computer 153, where the display device 171 of the computer 151 is spatially disposed adjacent to the display device 173 of the computer 153. In this example, for purpose of explanation, the display device 171 has a display resolution of 1920×1080, the display device 173 has a display resolution of 1024×768, the display device 175 has a display resolution of 1600×1200, and the display device 177 has a display resolution of 1440×900, but the invention is not limited to such. The display screens of the display devices 171, 173, 175 and 177 are respectively display screens 171$i$, 173$i$, 175$i$ and 177$i$.

First, the processor 111 obtains the spatial arrangement and respective display resolutions of the display devices 171, 173, 175 and 177. In some embodiment, the above information is obtained using automatic detection (i.e., by the processor 111 automatically communicating with the respective display devices via the respective computers), but the invention is not limited to such, and alternative methods are described later. Then, the processor 111 instructs the computers 151, 153, 155 and 157 to initialize the positions of the mouse cursor 160 (e.g., by sending appropriate commands to the computers). More specifically, the processor 111 controls each of the computers 151, 153, 155 and 157 to respectively initialize the position of the mouse cursor 160 for its screen. For example, without limitation, each computer may set the initial position of the mouse cursor 160 to be at the upper-left corner with coordinates (0, 0). In this example, the processor 111 controls the mouse cursor 160 to be located at the upper-left corner of the display screen 171$i$ of the computer 151 as its initial position, but other initial positions may be used as well. Then, the processor 111 receives a mouse displacement 1173 generated by the mouse 133, where the mouse displacement 1173 is a physical displacement generated by the user operating the mouse 133. After the processor 111 receives the mouse displacement 1173, it generates a mouse cursor displacement 1175 based on the acceleration setting 1171 and the mouse displacement 1173. The storage unit 117 stores the acceleration setting 1171, the mouse displacement 1173 and the mouse cursor displacement 1175.

Then, the processor 111 outputs the mouse cursor displacement 1175 to the computer 151 via the output interface 1151, and the computer 151 can move the position of the mouse cursor 160 based on the mouse cursor displacement 1175. This achieves control of the mouse cursor 160 by operation of the mouse 133. The acceleration setting 1171 may include pre-defined parameters, to allow the acceleration effect of the mouse cursor 160 when the user controls the mouse 133, so as to produce the effect of synchronized and instantaneous movements of the displayed mouse cursor with the mouse. When the processor 111 determines that the position of the mouse cursor 160 reaches a threshold 1177 of the display device 171 of the computer 151 (for example, the mouse cursor 160 reaches the right edge of the screen of the display device 171), the processor 111 switches the computers to allow the mouse 133 to control computer 153 (i.e. it switches the mouse control to computer 153). In this embodiment, the processor 111 integrally incorporates the switching element (not shown in the drawings), and uses the relative relationship of the mouse cursor 160 position and the threshold 1177 of the display device 171 to control the switching element so as to establish the communication connection between the mouse 133 and the computer 153, while the mouse's 133 control of the computer 151 is disrupted. However, the invention is not limited to such a configuration, and the switching element may be electrical circuitry that is separate from the processor 111. The threshold 1177 for each display device is a parameter related to the display resolution of the respective display device, which enables the processor 111 to determine the display boundary of the respective display device 171, 173, 175, 177. The thresholds 1177 may be pre-defined and stored in the storage unit 117. Each threshold 1177 may be less then or equal to the display resolution (i.e., the maximum value of the screen size) of the respective display device 171, 173, 175, 177 (this applies to each of the horizontal and vertical directions). For example, when the threshold 1177 is less than the display resolution of a display device 171, 173, 175 or 177, then the switching to the neighboring computer can occur before the mouse cursor 160 reaches the outer boundary of the current display screen. On the other hand, when the threshold 1177 is equal to the display resolution of a display device 171, 173, 175 or 177, then the switching to the neighboring computer will occur when the mouse cursor 160 reaches the outer boundary of the current display screen. A user may set the thresholds 1177 based on need, making the operation more flexible.

Optionally, the processor 111 of the resource sharing device 110 may be electrically coupled to an external interface 120. When the processor 111 is electrically coupled to the external interface 120, the user may use the external interface 120 to manually input the desired spatial arrangement of the display devices 171, 173, 175 and 177 (not shown) and their display resolutions (not shown) to the resource sharing device 110, and the processor 111 can then perform switching operation for the computers based on the above information. For example, in some embodiments, the spatial arrangement of the display devices 171, 173, 175 and 177 includes information regarding the various spatial arrangement of the display devices; because the display resolutions of the display devices may be different from each other, the spatial arrangement of the display devices may also include relative heights of the display devices 171, 173, 175 and 177. The external interface 120 may be, for example and without limitation, a hand-held electronics device, a computer, or other devices that have information input capabilities. Using the external interface 120 to set the spatial arrangement and display resolutions of the display devices is only one example, and the invention is not limited to such. In other embodiments of the present invention, processing circuits and press buttons (not shown) provided on the resource sharing device 110 may be used to manually input the spatial arrangement and display resolutions of the display devices. In other embodiments, the processor 111 of the resource sharing device 110 may automatically detect the display resolutions of the display devices 171, 173, 175 and 177 using firmware or software.

In addition, the processor 111 may receive a selection command (not shown), and based on the command, execute a display resolution calculation program to further generate the display resolution data of the display devices. In such an embodiment, the selection command may be, for example, a command related to the spatial arrangement of the display devices 171, 173, 175 and 177. As the spatial arrangement of the display devices 171, 173, 175 and 177 is not limited to a left to right horizontal arrangement shown in FIG. 1, but can also be a vertical arrangement or a stacked arrangement based on user need, the resource sharing device 110 internally stores multiple specific spatial arrangements for the user to select, and the user can use a hot key to select a spatial arrangement of display devices. In the embodiment of FIG. 1, for example, the user can select a left-to-right horizontal arrangement. After the user selects the spatial arrangement, the processor 111 executes a display resolution calculation program for the display devices. An example is described below for calculating the display resolution of the display device 171. In this example, the user presses the left button of the mouse 133 and drags the mouse cursor 160 from the upper-left corner (e.g., coordinates (0, 0)) to the lower-right corner (e.g., coordinates (1920, 1080)), and then releases the left button of the mouse 133, to generate a corresponding mouse cursor displacement 1175. Then, the processor 111 calculates, based on the mouse cursor displacement 1175, that the display resolution is (1920, 1080). By executing the display resolution calculation program for each display device, the processor 111 identifies the display resolution of the display devices 171, 173, 175 and 177. Using the display resolution calculation program is only one way to identify the display resolution of the display devices 171, 173, 175 and 177, and the invention is not limited to such. The selection command may be generated by, for example, the user operating the external interface 120 or the processing circuitry or press buttons provided in the resource sharing device 110.

More specifically, as shown in FIG. 3A, the display screens 171*i*, 173*i*, 175*i* and 177*i* of the display devices 171, 173, 175 and 177 respectively have pixels 171max, 173max, 175max and 177max located at positions corresponding to the display resolution values. The processor 111 can update a reference coordinate within the resource sharing device 110 based on the mouse cursor displacement 1175, and the reference coordinate corresponds to the position of the mouse cursor 160 on the display device 171. In the example of FIG. 3A, the mouse cursor displacement 1175 represents a displacement d1, so the processor 111 can update the reference coordinate based on the mouse cursor displacement 1175, and provides the updated reference coordinate to the computer 151 so that the computer 151 moves the mouse cursor 160 to the new mouse cursor position 160*a*. Here, it should be understood that the reference coordinate includes two coordinate values for the horizontal and vertical directions.

Figure 3B:
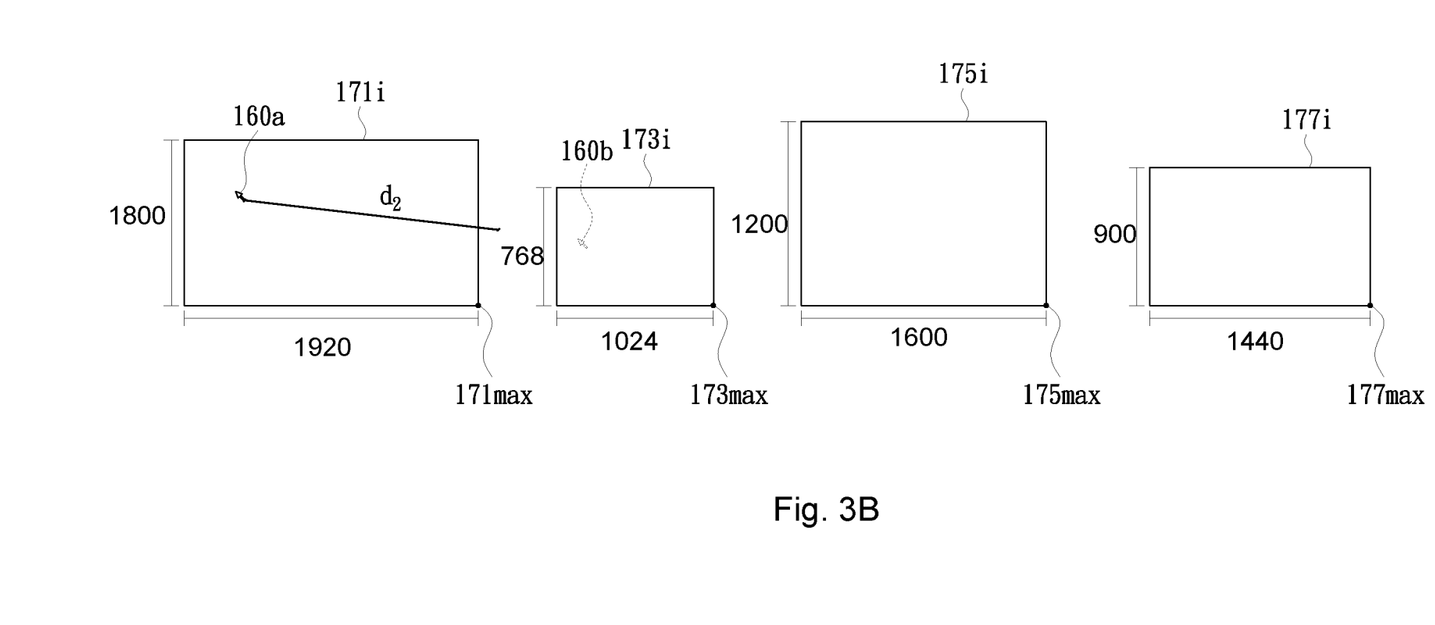
FIG. 3B schematically illustrates the display screens of multiple display devices of the resource sharing system according to an embodiment of the present invention.

The resource sharing device 110 stores, for example in the storage unit 117, a current coordinate threshold which may be, for example, less than or equal to the display resolution of the display device 171 of the computer 151 that is currently controlled by the mouse 133. If the current coordinate threshold is less than the display resolution of the display device 171, the processor 111 will give mouse 133 control of the computer 153 when the processor 111 determines that the reference coordinate is greater than the current coordinate threshold. If the current coordinate threshold is equal to the display resolution of the display device 171, the processor 111 will give mouse 133 control of the computer 153 when the processor 111 determines that the reference coordinate is equal to the current coordinate threshold. For example, in the example shown in FIG. 3B, the mouse cursor displacement 1175 represents a displacement d2; the processor 111 determines that the reference coordinate is equal to the current coordinate threshold (the display resolution of the display device 171), so the processor 111 gives mouse 133 control of the computer 153. Further, after the mouse 133 is given control of the computer 153, the processor 111 sets the current coordinate threshold to be less than or equal to the display resolution of the display device 173 coupled to the currently controlled computer 153. Again, it should be noted that the mouse cursor position, the current coordinate threshold, and the display resolution all have both horizontal and vertical values, and the descriptions above apply to both directions.

Also, when the processor 111 identifies the spatial arrangement and display resolutions of the display devices 171, 173, 175 and 177, the processor 111 can establish a relative coordinate system based on the relative locations of the display devices 171, 173, 175 and 177 and their display resolutions. Such a relative coordinate system includes the relevant information regarding the arrangements of the display devices 171, 173, 175 and 177 in the vertical and horizontal directions and their relative heights. Based on the relative coordinate system and the mouse cursor displacement 1175, the processor 111 determines whether the mouse cursor 160 has reached the threshold 1177, and performs switching of computers based on this determination. For example, the relative coordinate system may be a virtual reference screen which includes adjoining areas corresponding to the multiple display devices 171, 173, 175 and 177, where the relative locations of these areas are based on the relative locations of the display devices and their display resolutions. Based on the mouse cursor displacement, the processor 111 calculates a mouse cursor position within the virtual reference screen, and determines whether the mouse cursor position has moved outside of the area of one computer, so as to determine whether the control should be switched to another computer.

Further, before the processor 111 instructs the computers 151, 153, 155 and 157 to initialize the positions of the mouse cursor 160, the processor 111 may optionally turn off the internal mouse cursor acceleration functions of the computers 151, 153, 155 and 157. This is because when the computers 151, 153, 155 and 157 use different software or firmware, or their respectively coupled display devices 171, 173, 175 and 177 have different display resolutions, different mouse cursor acceleration parameters may be present in different computers. Thus, according to an embodiment of the present invention, the resource sharing device 110 turns off the internal mouse cursor acceleration functions of all computers 151, 153, 155 and 157, and further, it uses its own default or user-defined acceleration parameter to calculate the mouse cursor displacement. This way, the movement of the mouse cursor 160 on different display devices 171, 173, 175 and 177 can avoid the problem of non-uniform speed and lack of synchronization. It can also avoid the problem of incorrect display of mouse cursor 160 position by computers 151, 153, 155 and 157 when they receive the mouse cursor displacement 1175 due to their internal mouse cursor acceleration functions.

More specifically, the acceleration setting 1171 may include a first component transformation value and a second component transformation value that are pre-defined and pre-stored in the storage unit 117 (such as look-up tables), and the mouse displacement 1173 includes a first component and a second component. The processor 111 calculates the first component using the first component transformation value and calculates the second component using the first component transformation value, to obtain the mouse cursor displacement 1175. For example, the first component may be the x-axis component of the mouse displacement 1173, and the second component may be the y-axis component of the mouse displacement 1173; the first component transformation value and the second component transformation value are pre-defined acceleration or deceleration parameters in the x' axis and y' axis directions of the mouse cursor movement, respectively, which achieve acceleration or deceleration effects when the user uses the mouse 133 to control the mouse cursor 160 movement. Here, the x axis and y axis are the coordinate axes in the plane where the mouse 133 is operated, and the x' axis and y' axis are the coordinate axes in the plane of the display screen where the mouse cursor 160 is displayed. These are commonly used terminology for describing mouse operations, and will not be explained in more detail here. More specifically, the first component transformation value and the second component transformation value are the magnification for the first component and the second component, for example. Generally speaking, when the mouse moves at different physical speeds (i.e. taking different amounts of time to move the same distance), the acceleration setting 1171 will use different magnification values, with greater magnification provided for higher speed of mouse movement. In this embodiment, the processor 111 determines the value of the first and second components of the mouse displacement, and if it determines that the first component is greater than the second component, it further looks up the first component transformation value using the look-up tables, and uses it to magnify both the first component and the second component by the same amount in order to keep the movement direction of the mouse cursor 160 unchanged, and vice versa.

The resource sharing device 110 may further include an input interface 1131, which may be electrically coupled to the keyboard 131, to control the computer that the mouse has gained control of. In other words, in many embodiments, the resource sharing device 110 switches the keyboard 131 and the mouse 133 to the same computer.

Figure 4:
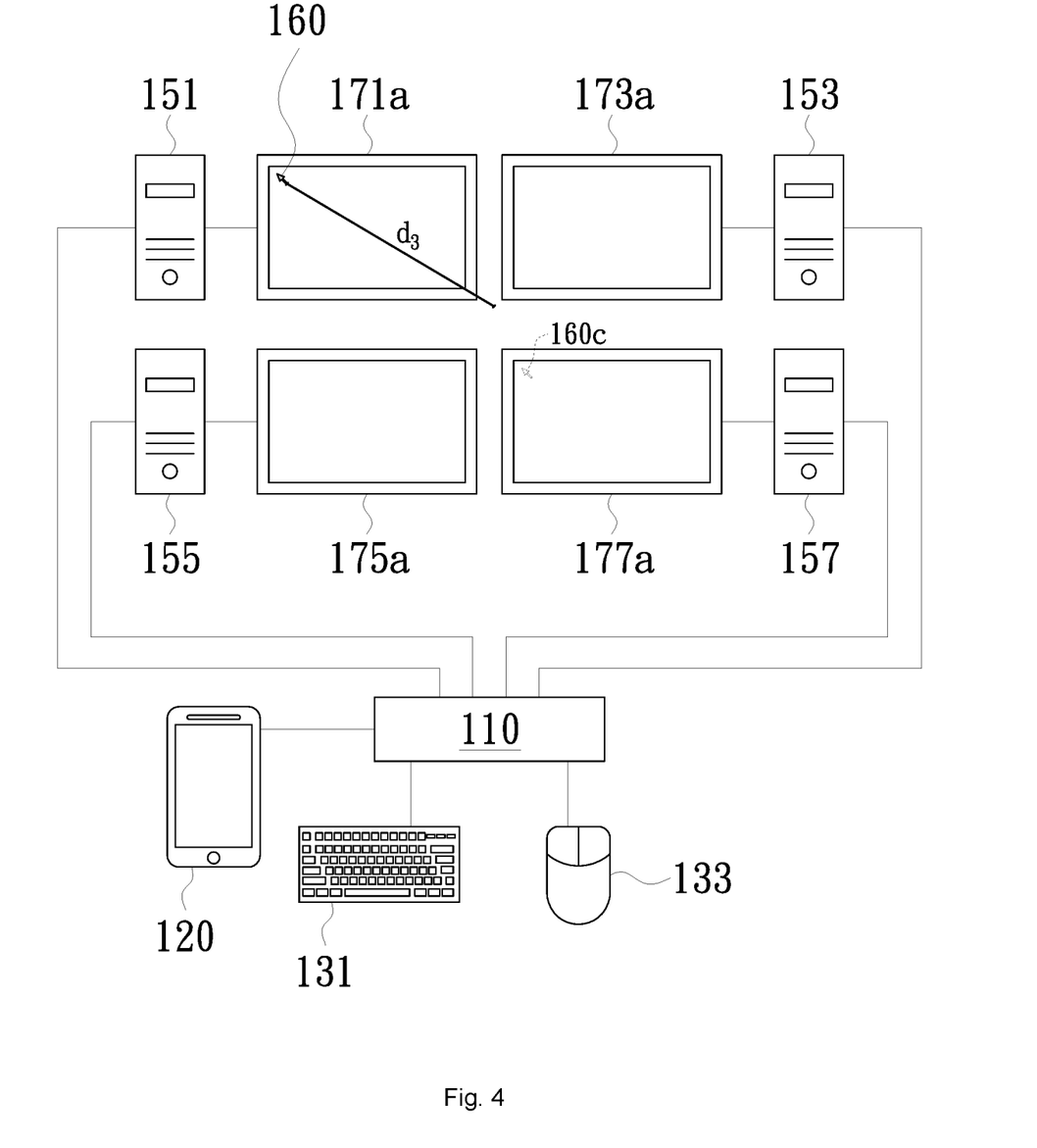
FIG. 4 schematically illustrates a resource sharing system according to another embodiment of the present invention.

Refer to FIG. 4, which schematically illustrates a resource sharing system according to another embodiment of the present invention. The resource sharing device 110 of this embodiment is similar to that shown in FIGS. 1-3B, the differences being: the display devices 171a, 173a, 175a and 177a of the computers 151, 153, 155 and 157 are spatially arranged in a 2×2 array; the display device 171a is adjacent to the display devices 173a and 175a in the horizontal and vertical directions, respectively, and is adjacent to the display device 177a in a diagonal direction. The display devices 173a and 175a are adjacent to each other in another diagonal direction. For example, when the user wishes to switch the control from computer 151 which is currently controlled by the mouse 133 to computer 157, the use can operate the mouse 133 to generates a mouse displacement 1173, and the processor 111 correspondingly generates the mouse cursor displacement 1175 based on the acceleration setting 1171. When the mouse cursor displacement 1175 represents a displacement d3, the processor 111 updates the reference coordinate based on the mouse cursor displacement 1175 to move the mouse cursor 160 to the position 160c. The processor 111 now determines that the reference coordinate has reached the threshold value (e.g. the display resolution of the display device 171a), so the processor 111 gives mouse 133 control of the computer 157, and further sets the new threshold value based the display resolution of the display device 177, in similar manners as described earlier.

Figure 5:
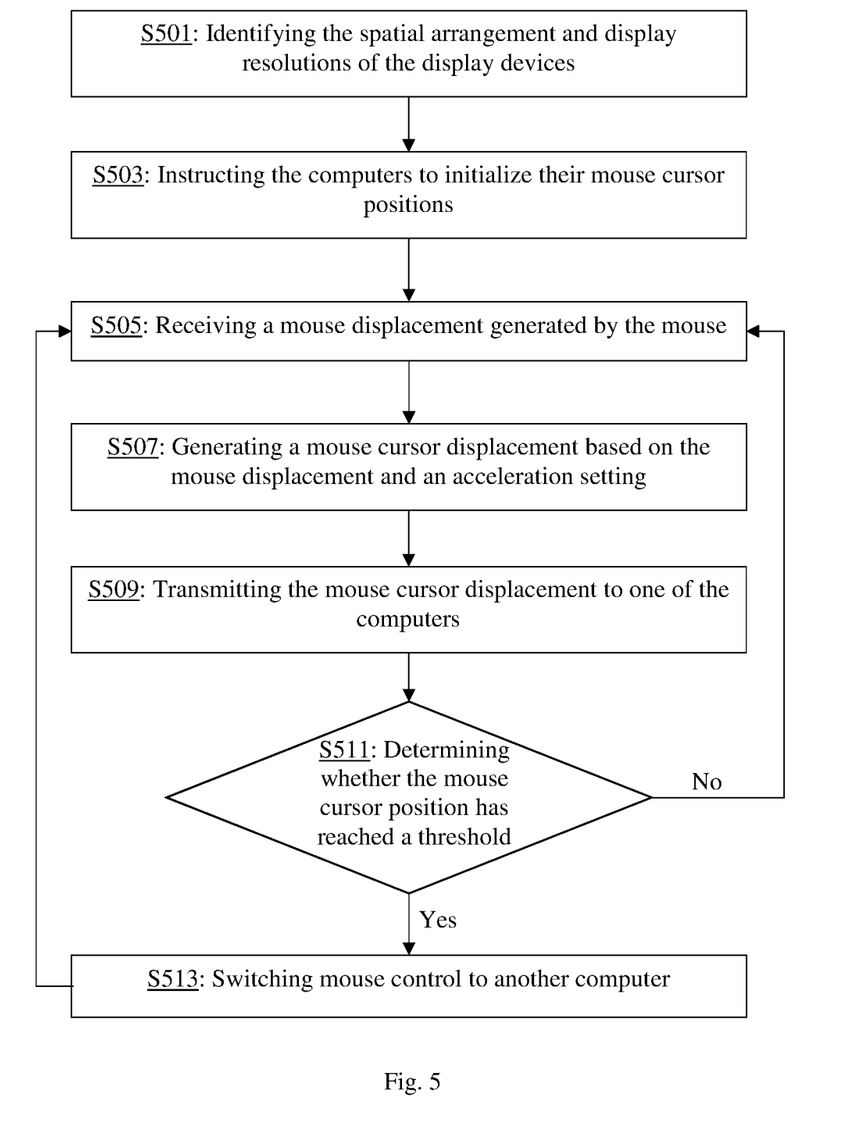
FIG. 5 is a flow chart showing the control method of a resource sharing device according to an embodiment of the present invention.

Refer to FIG. 5, which is a flow chart showing the control method of a resource sharing device according to an embodiment of the present invention. The control method of the resource sharing device includes the following steps, which may be performed, for example, by the processor 111. Step S501 includes identifying the spatial arrangement and display resolutions of the display devices. Then step S503 includes instructing the computers to initialize their mouse cursor positions. Step S505 includes receiving a mouse displacement generated by the mouse. Then, step S507 includes generating a mouse cursor displacement based on the mouse displacement and an acceleration setting. Step S509 includes transmitting the mouse cursor displacement to one of the computers. Then, step S511 includes determining whether the mouse cursor position has reached a threshold. If the determination is affirmative, then in step S513, the mouse control is switched to another computer, and the process then returns to step S505. If the determination is negative, the process returns to step S505.

The details of the above steps have already been described and are not repeated here.

Figure 6:
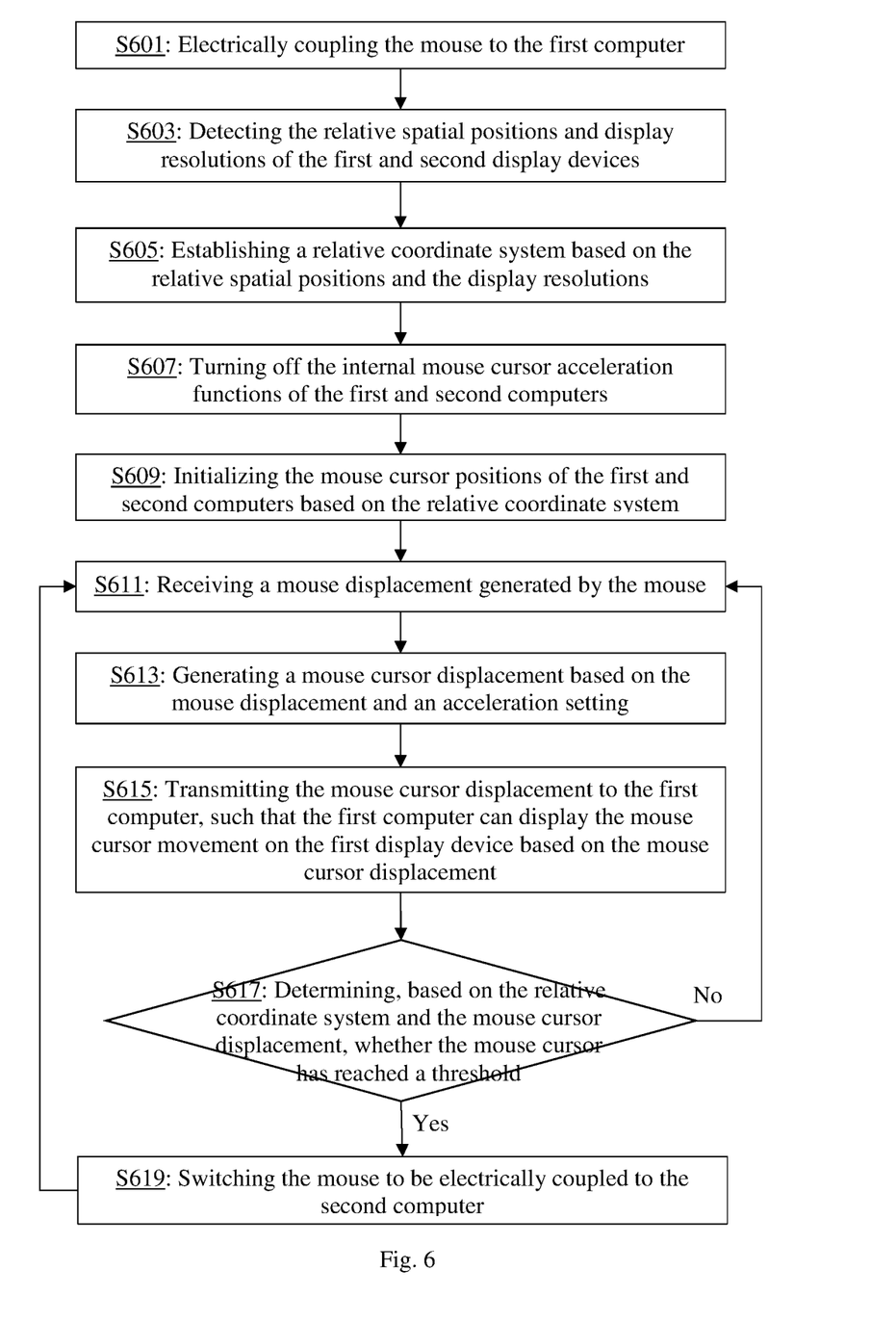
FIG. 6 is a flow chart showing the control method of a resource sharing device according to another embodiment of the present invention.

Refer to FIG. 6, which is a flow chart showing the control method of a resource sharing device according to another embodiment of the present invention. Referring also to FIGS. 1-3B, the switch of control from computer 151 to computer 153 is used as an example here; the first computer and second computer mentioned here refer to computers 151 and 153, and the first and second display devices refer to display devices 171 and 173. The control method of a resource sharing device includes steps S601-S619, which may be performed, for example, by the processor 111. Step S601 includes electrically coupling the mouse 133 to the first computer. Step S603 includes detecting the relative spatial positions and display resolutions of the first and second display devices. Step S605 includes establishing a relative coordinate system based on the relative spatial positions and the display resolutions. Then, step S607 includes turning off the internal mouse cursor acceleration functions of the first and second computers. Step S609 includes initializing the mouse cursor positions of the first and second computers based on the relative coordinate system. Then, step S611 includes receiving a mouse displacement generated by the mouse. Step S613 includes generating a mouse cursor displacement based on the mouse displacement and an acceleration setting. Then, step S615 includes transmitting the mouse cursor displacement to the first computer, such that the first computer can display the mouse cursor movement on the first display device based on the mouse cursor displacement. For example, the mouse cursor movement may be from cursor position 160 to cursor position 160a in FIG. 3A, or from cursor position 160 to cursor position 160b in FIG. 3B. Then, step S617 includes determining, based on the relative coordinate system and the mouse cursor displacement, whether the mouse cursor has reached a threshold. If the determination is affirmative, then step S619 includes switching the mouse to be electrically coupled to the second computer, and the process then returns to step S611. If the determination is negative, the process returns to step S611. Here, the threshold may be, for example, the display boundary of the first display device; the display boundary may be, for example, the current display resolution of the first display device, or a value that is close to but less than the current display resolution of the first display device. Related descriptions have been provided earlier.

The details of the above steps S601-S619 have already been described earlier and are not repeated here.

To summarize, the resource sharing device and its control method according to embodiments of the present invention can automatically determine whether the mouse cursor has reached or exceeded the threshold of the display device that is electrically coupled to the current computer, in order to determine whether to switch to another computer. This replaces the conventional manual switching methods and provides a smooth operation experience.

While embodiments of the invention are described above, the invention is not limited to the embodiment. Those skilled in the art can make various modification and variations without departing from the spirit or scope of the invention. Thus, it is intended that the present invention cover modifications and variations that come within the scope of the appended claims and their equivalents.

What is claimed is:

1. A control method for a resource sharing device, the resource sharing device being electrically coupled to a plurality of computers and a mouse, the mouse being configured to control a mouse cursor, each of the plurality of computers being electrically coupled to a display device, the method comprising:
   identifying a spatial arrangement and display resolutions of the display devices;
   instructing each of the computers to initialize a position of the mouse cursor;
   receiving a mouse displacement generated by the mouse;
   generating a mouse cursor displacement based on the mouse displacement and an acceleration setting;
   transmitting the mouse cursor displacement to one of the plurality of computers;
   determining whether the position of the mouse cursor has reached a threshold, wherein the threshold is less than or equal to the display resolution of the display device coupled to the one of the plurality of computers; and
   in response to a determination that the position of the mouse cursor has reached the threshold, switching mouse control to another one of the plurality of computers.

2. The control method of claim 1, wherein the step of identifying the spatial arrangement and the display resolutions of the display devices includes:
   receiving, from an external interface, information specifying the spatial arrangement and display resolutions.

3. The control method of claim 1, wherein the step of identifying the spatial arrangement and the display resolutions of the display devices includes:
   receiving a selection command, and based on the selection command, executing a display resolution calculation program to generate information specifying display resolutions of the display devices, wherein the selection command corresponds to a selected spatial arrangement of the display devices.

4. The control method of claim 1, wherein the step of determining whether the position of the mouse cursor has reached the threshold includes:

updating a reference coordinate based on the mouse cursor displacement, the reference coordinate corresponding to a position of the mouse cursor on one of the display devices; and determining whether the reference coordinate is greater than a current coordinate threshold.

5. The control method of claim 4, wherein the current coordinate threshold is less than a display resolution of a display device electrically coupled to the one of the plurality of computers.

6. The control method of claim 1, wherein the step of determining whether the position of the mouse cursor has reached the threshold includes:

updating a reference coordinate based on the mouse cursor displacement, the reference coordinate corresponding to a position of the mouse cursor on one of the display devices; and determining whether the reference coordinate is equal to a current coordinate threshold.

7. The control method of claim 6, wherein the current coordinate threshold is equal to a display resolution of a display device electrically coupled to the one of the plurality of computers.

8. The control method of claim 6, wherein the step of switching the mouse control to the other one of the plurality of computers includes:

setting the current coordinate threshold to a display resolution of a display device electrically coupled to the other one of the plurality of computers.

9. A resource sharing device, comprising:

an input interface, configured to be electrically coupled to a mouse and to receive data generated by the mouse, including mouse displacements;

a plurality of output interfaces, each configured to be electrically coupled to a computer which is in turn electrically coupled to a display device, and configured to transmit mouse displacements to the computer;

a processor, electrically coupled to the input interface and the plurality of output interfaces, and configured to: identify a spatial arrangement and display resolutions of the display devices, instruct each of the computers to initialize a position of the mouse cursor, receive a mouse displacement generated by the mouse and generate a mouse cursor displacement based on the mouse displacement and an acceleration setting, transmit the mouse cursor displacement to one of the plurality of computers, and in response to a determination that the position of the mouse cursor has reached a threshold which is less than or equal to the display resolution of a corresponding display device which is electrically coupled to the one computer, switch mouse control to another one of the plurality of computers; and a storage unit, electrically coupled to the processor, configured to store the acceleration setting, the mouse displacement and the mouse cursor displacement.

10. The resource sharing device of claim 9, further comprising an external interface, wherein the processor is configured to receive information specifying the spatial arrangement and display resolutions of the display devices from the external interface.

11. The resource sharing device of claim 9, wherein the processor is configured to:

receive a selection command which corresponds to a spatial arrangement of the display devices, and based on the command, execute a display resolution calculation program to generate information specifying the display resolutions of the display devices.

12. The resource sharing device of claim 9, wherein the processor is configured to:

update a reference coordinate based on the mouse cursor displacement, the reference coordinate corresponding to a position of the mouse cursor on the corresponding display device, an in response to a determination that the reference coordinate is greater than a current coordinate threshold, switch the mouse control to the other computer.

13. The resource sharing device of claim 12, wherein the current coordinate threshold is less than a display resolution of the corresponding display device that is electrically coupled to the one computer.

14. The resource sharing device of claim 9, wherein the processor is configured to:

update a reference coordinate based on the mouse cursor displacement, the reference coordinate corresponding to a position of the mouse cursor on the corresponding display device, an in response to a determination that the reference coordinate is equal to a current coordinate threshold, switch the mouse control to the other computer.

15. The resource sharing device of claim 14, wherein the current coordinate threshold is equal to a display resolution of the corresponding display device that is electrically coupled to the one computer.

16. A control method for a resource sharing device, the resource sharing device being electrically coupled to a first computer, a second computer and a mouse, the first computer being electrically coupled to a first display device and the second computer being electrically coupled to a second display device, the method comprising:

electrically coupling the mouse to the first computer;

detecting relative spatial positions and display resolutions of the first and second display devices;

establishing a relative coordinate system which is a virtual reference screen including adjoining areas corresponding to the display devices, wherein relative locations of the adjoining areas are based on the relative spatial positions and the display resolutions of the display devices wherein the relative coordinate system extends across an entirety of the virtual reference screen;

turning off internal mouse cursor acceleration functions of the first and second computers;

initializing the mouse cursor positions of the first and second computers based on the relative coordinate system;

receiving a mouse displacement generated by the mouse;

generating a mouse cursor displacement based on the mouse displacement and an acceleration setting;

transmitting the mouse cursor displacement to the first computer, wherein the first computer displays a mouse cursor movement on the first display device based on the mouse cursor displacement;

determining, based on the relative coordinate system and the mouse cursor displacement, whether the position of the mouse cursor has reached a threshold, wherein the threshold is less than or equal to the display resolution of the display device coupled to the first computer;

in response to a determination that the position of the mouse cursor has reached the threshold, switching the mouse to be electrically coupled to the second computer.

17. The control method of claim 16, wherein the threshold is a display boundary of the first display device.

18. The control method of claim 17, wherein the display boundary is the display resolution of the first display device.

19. The control method of claim 16, wherein the acceleration setting include a first component transformation value and a second component transformation value, and the mouse displacement includes a first component and a second component.

20. The control method of claim 19, further comprising:
determining a value of the first component and a value of the second component of the mouse displacement,
in response to a determination that the first component is greater than the second component, processing the first component and the second component using the first component transformation value to obtain the mouse cursor displacement, and
in response to a determination that the second component is greater than the first component, processing the first component and the second component using the second component transformation value to obtain the mouse cursor displacement.

* * * * *